United States Patent [19]

Kojimoto et al.

[11] Patent Number: 5,127,185
[45] Date of Patent: * Jul. 7, 1992

[54] COATED SEEDS

[75] Inventors: Susumu Kojimoto; Fumio Nii; Toshio Mori, all of Osaka, Japan

[73] Assignee: Sumitomo Chemical Co., Ltd., Osaka, Japan

[*] Notice: The portion of the term of this patent subsequent to Feb. 7, 2007 has been disclaimed.

[21] Appl. No.: 643,213

[22] Filed: Aug. 22, 1984

[51] Int. Cl.$^5$ ............................................. A01C 1/06
[52] U.S. Cl. ................................ 47/57.6; 47/DIG. 9
[58] Field of Search ........................ 47/57.6, DIG. 9

[56] References Cited

U.S. PATENT DOCUMENTS

| | | | |
|---|---|---|---|
| 2,967,376 | 1/1961 | Scott, Jr. | 47/57.6 |
| 3,545,129 | 12/1970 | Schreiber | 47/57.6 |
| 3,621,612 | 11/1971 | Porter | 47/57.6 |
| 3,947,996 | 4/1976 | Watts | 47/57.6 |
| 3,991,517 | 11/1976 | Lewis | 47/57.6 |
| 4,068,602 | 1/1978 | Mickus | 47/57.6 |
| 4,251,952 | 2/1981 | Porter | 47/57.6 |
| 4,396,413 | 8/1983 | Miller | 47/57.6 |

FOREIGN PATENT DOCUMENTS

| | | | |
|---|---|---|---|
| 54-85908 | 7/1979 | Japan . | |
| 403411 | 12/1933 | United Kingdom | 57/57.6 |
| 405675 | 2/1934 | United Kingdom | 47/57.6 |
| 886776 | 4/1980 | U.S.S.R. | 47/57.6 |
| 1085538 | 4/1984 | U.S.S.R. | 47/57.6 |

*Primary Examiner*—Danton D. DeMille
*Attorney, Agent, or Firm*—Sughrue, Mion, Zinn, Macpeak & Seas

[57] ABSTRACT

Coated seeds covered with a water repellent and a coating layer formed thereon, the water repellent being attached to the seed surface with or without a binder. The coated seeds have a high germination percentage even when sown in a field where the content of soil water is high.

14 Claims, No Drawings ent and then with a coating material.

COATED SEEDS

FIELD OF THE INVENTION

The present invention relates to coated seeds obtained by covering the seed surface with a water repellent and then with a coating material.

BACKGROUND OF THE INVENTION

Precise sowing, either mechanically or by hand, has recently come into general use in order to save labor and stabilize growth in vegetable culture. Further, transplanting culture using a seedling tray, pot, etc., has become popular, too. With respect to the sowing into a seedling tray, it is said that accurate and precise sowing by machines or instruments is a necessary condition for the growing of good seedlings. Though the precise sowing is thoroughly possible to achieve mechanically in case of significantly large-sized, spherical seeds such as soybeans and red beans, it is very difficult to achieve mechanically in the case of odd-shaped seeds of lettuce, carrot, and Welsh onion, and in the case of small-grained seeds of cabbage and Chinese cabbage. Hand sowing of these seeds is inefficient, requiring much labor.

In order to overcome these disadvantages, it has become a common practice to coat seeds with a proper material to produce spherical grains larger than the seeds. The coating material for this purpose is a mixture of an inorganic matter such as diatomaceous earth, talc, clay, and calcium carbonate, and a binder such as starch, gelatin, and PVA (polyvinyl alcohol). Coated seeds thus produced have a problem. That is, when they are sown in a field where the groundwater level is high or the soil contains excess water due to rainfall after sowing, or in a soil having a high water content due to excessive flooding, the surroundings of the seeds are sealed with water, whereby supply of oxygen to the seeds becomes insufficient to cause poor germination. In order to overcome this disadvantage there was proposed the coating of seeds with a coating material containing a water repellent or waterproofing agent, as disclosed in Japanese Patent Application (OPI) No. 85908/1979 and Japanese Patent Publication No. 3469/1963. (The term "OPI" herein used means an "unexamined published Japanese patent application".)

With respect to these proposed methods, the present inventors carried out various testings. As the result, they found that even in these methods, if the soil in which the coated seeds are sown has a high water content due to a large quantity of rainfall or excessive flooding, poor germination still occurs, leading to insufficient results.

Germination of coated seeds generally takes place in the following manner: A coating layer of the coated seed sown in a soil absorbs water in the soil supplied due to rainfall or flooding and cracks into several portions, whereby a part of the naked seed is exposed from the coating layer. The seed receives oxygen mainly through these cracks and simultaneously absorbs water in the soil to germinate. At this time, if the water content is in excess, supply of oxygen to the seeds becomes insufficient, leading to poor germination. On the other hand, if the water content is too low, there is caused poor germination due to shortage of water. Accordingly, oxygen and water are indispensable for the germination of seeds, and if the quantity of water surrounding the seeds is controlled, stable germination can be achieved. One way of achieving this is to coat seeds with a coating material having mixed with and dispersed therein a water repellent or waterproofing agent, as described above. However, in this method, when there is a large quantity of rainfall or excessive flooding, excessive water surrounding the seeds which is not absorbed by soil infiltrates into the interface between the seed and the coating layer through the cracks of the coating layer, leading to a situation where the surroundings of the seeds are sealed with water to cause insufficient supply of oxygen to the seeds. Thus, the seeds become dead or damaged to cause poor germination.

As the result of extensive studies, the present inventors found that these problems can be solved by coated seeds obtained by covering the seed surface with a water repellent and then with a coating material. The present invention was completed based on this finding.

SUMMARY OF THE INVENTION

It is an object of this invention to provide coated seeds which germinate satisfactorily without being damaged even when the soil water content varies over a broad range. According to this invention, the seed is covered with a water repellent which prevents the surface of seed from being sealed by the water infiltrating through the cracks of the coating layer.

DETAILED DESCRIPTION OF THE INVENTION

The covering of the seeds with a water repellent can be accomplished by simply contacting the seeds with the water repellent. In order to ensure the adhesion of the water repellent to the seeds, there can be employed a method in which the seed surface is preliminarily moistened with a binder such as starch and polyvinyl alcohol (PVA) and then covered with the water repellent. By this method, even when the coating layer is peeled off, since the water repellent strongly adheres to the seed surface, it can be prevented that the peeled coating layer captures the water repellent whereby the seed surface is exposed.

The water repellent which can be used in this invention includes, for example, wax, asphalt, fatty acids and metal salts thereof, mineral oil, and rosin. Among them, fatty acids and metal salts thereof such as stearic acid, calcium stearate, and barium stearate are preferred from the standpoint of adhesion to the seed surface, workability, and effect. The quantity of the water repellent is not specifically limited and it may be selected according to the kind, size, shape, and properties of seeds to be coated.

The coating layer to be placed on the water repellent can be made from diatomaceous earth, talc, clay, calcium carbonate, and any other inorganic materials which are capable of coating. They may be used individually or in combination with one another. In addition, the coating layer may contain a small amount of a water repellent or a waterproofing agent.

The coating material can be incorporated with a suitable amount of a pesticide, a fungicide to prevent disease after germination and/or a germination promoter.

The coating of the seeds on which the water repellent has been placed can be accomplished by any known method using a fluid bed granulator (air-suspension coating apparatus) or rotary pan.

The invention is described in more detail with reference to the following Examples and Comparative Examples, which are not intended to limit the scope of this invention.

EXAMPLE 1

Coating on onion seeds was accomplished as follows: One liter of onion seeds having a germination percentage of 90% was sprayed with a 1% aqueous solution of PVA and then covered with 50 g of calcium stearate. The seeds were coated with clay while spraying a 2% aqueous solution of PVA by using a rotary pan.

The coated seeds were 4.0 to 5.5 mm in diameter. After drying at 35° C. for 24 hours, the coated seeds were sown in four plots of field. Flooding was performed every other day so that the soil water content was kept at 45%, 60%, 75% and 100% of the maximum water capacity. The germination percentage was measured. The results are shown in Table 1.

EXAMPLE 2

Coating on onion seeds was accomplished as follows: One liter of the same onion seeds as used in Example 1 was covered with 40 g of stearic acid powder and the coating of clay was performed in the same way as in Example 1. Sowing and flooding were performed and the germination percentage was measured in the same way as in Example 1. The results are shown in Table 1.

COMPARATIVE EXAMPLE 1

Coating on onion seeds was accomplished as follows: One liter of the same onion seeds as used in Example 1 was coated with clay in the same way as in Example 1. Sowing and flooding were performed and the germination percentage was measured in the same way as in Example 1. The results are shown in Table 1.

COMPARATIVE EXAMPLE 2

Coating on onion seeds was accomplished as follows: One liter of the same onion seeds as used in Example 1 was coated with a mixture composed of 10 wt % calcium stearate and 90 wt % clay in the same way as in Example 1. Sowing and flooding were performed and the germination percentage was measured in the same way as in Example 1. The results are shown in Table 1.

TABLE 1

| | Water Repellent | Coating Material | Germination Percentage (%) | | | |
|---|---|---|---|---|---|---|
| | | | 45% Plot | 60% Plot | 75% Plot | 100% Plot |
| Example 1 | Calcium stearate (50 g/seed 1 liter) | Clay | 88 | 90 | 92 | 90 |
| Example 2 | Stearic acid powder (40 g/seed 1 liter) | Clay | 89 | 90 | 88 | 90 |
| Comparative Example 1 | None | Clay | 88 | 88 | 85 | 5 |
| Comparative Example 2 | None | Clay/calcium stearate (90/10) | 85 | 88 | 85 | 35 |

Note:
Germination percentage was measured 12 days after the sowing. (Number of germinated seeds/Number of sown seeds) × 100 (%).
The soil water content is expressed in terms of the ratio of held water to maximum water capacity.

As Table 1 shows, in Examples 1 and 2, the germination percentage measured 12 days after the sowing was equal to the original germination percentage (90%) in the plots where the water content was 60%, 75%, and 100%. In the Comparative Examples, the germination percentage significantly decreased when the soil water content was kept at 100% of the maximum water capacity.

While the invention has been described in detail and with reference to specific embodiments thereof, it will be apparent to one skilled in the art that various changes and modifications can be made therein without departing from the spirit and scope thereof.

What is claimed is:

1. A method for coating odd-shaped or small-grained seeds to thereby make the seeds suitable for sowing by machines or instruments, said method comprising covering the odd-shaped or small-grained seeds with two or more coating layers, wherein at least the innermost coating layer contains a water repellant selected from the group consisting of fatty acids and metal salts thereof.

2. A method as claimed in claim 1, wherein said odd-shaped seeds are seeds of lettuce, carrot, or Welsh onion.

3. A method as claimed in claim 1, wherein said small-grained seeds are seeds of cabbage or Chinese cabbage.

4. The method of claim 1 wherein said fatty acid is stearic acid.

5. The method of claim 1 wherein said metal salt of a fatty acid is calcium stearate or barium stearate.

6. The method of claim 1 wherein said water repellant is attached to the seed surface with a binder.

7. The method of claim 6 wherein said binder is starch or polyvinyl alcohol.

8. Multi-coated seeds having two or more coating layers, wherein at least the innermost coating layer contains a water repellant selected from the group consisting of fatty acids and metal salts thereof.

9. Coated seeds as claimed in claim 8, wherein said water repellant is attached to the seed surface with a binder.

10. The coated seeds of claim 9 wherein said binder is starch or polyvinyl alcohol.

11. Coated seeds as claimed in claim 8, wherein said water repellent is a fatty acid.

12. The coated seeds of claim 11 wherein said fatty acid is stearic acid.

13. Coated seeds as claimed in claim 8, wherein said water repellent is a metal salt of a fatty acid.

14. The coated seeds of claim 13 wherein said metal salt of a fatty acid is calcium stearate or barium stearate.

* * * * *